United States Patent
Crecelius et al.

(10) Patent No.: US 11,218,063 B2
(45) Date of Patent: Jan. 4, 2022

(54) SEGMENTED SWITCHED RELUCTANCE MOTOR FOR POWERTRAIN ELECTRIFICATION

(71) Applicant: AMERICAN AXLE & MANUFACTURING, INC., Detroit, MI (US)

(72) Inventors: David Crecelius, Cicero, IN (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 148 days.

(21) Appl. No.: 16/695,995

(22) Filed: Nov. 26, 2019

(65) Prior Publication Data
US 2020/0099282 A1 Mar. 26, 2020

Related U.S. Application Data

(62) Division of application No. 15/285,217, filed on Oct. 4, 2016, now Pat. No. 10,516,323.

(51) Int. Cl.
| | |
|---|---|
| *B60K 6/48* | (2007.10) |
| *F16H 37/08* | (2006.01) |
| *F16H 57/02* | (2012.01) |
| *H02K 19/10* | (2006.01) |
| *H02K 7/00* | (2006.01) |
| *H02K 11/21* | (2016.01) |
| *B60K 6/26* | (2007.10) |
| *B60K 6/485* | (2007.10) |

(Continued)

(52) U.S. Cl.
CPC ............. *H02K 19/103* (2013.01); *B60K 6/26* (2013.01); *B60K 6/485* (2013.01); *F02N 11/14* (2013.01); *F16H 57/02* (2013.01); *H02K 7/006* (2013.01); *H02K 11/21* (2016.01); *B60K 2006/264* (2013.01); *B60K 2006/268* (2013.01); *B60Y 2200/92* (2013.01); *B60Y 2400/60* (2013.01); *F02N 11/00* (2013.01); *F02N 11/04* (2013.01); *F02N 2011/0896* (2013.01); *F16H 57/023* (2013.01); *F16H 2057/02034* (2013.01); *H02K 11/215* (2016.01); *Y10S 903/906* (2013.01); *Y10S 903/952* (2013.01)

(58) Field of Classification Search
CPC ........ F16H 37/0806; B60K 2006/4816; B60K 2006/4825
USPC ............................................. 74/661
See application file for complete search history.

(56) References Cited

U.S. PATENT DOCUMENTS

| | | |
|---|---|---|
| 4,315,171 A | 2/1982 | Schaeffer |
| 4,348,605 A | 9/1982 | Torok |

(Continued)

OTHER PUBLICATIONS

U.S. Appl. No. 15/285,217, filed Oct. 4, 2016.

*Primary Examiner* — Ha Dinh Ho
(74) *Attorney, Agent, or Firm* — Burris Law, PLLC

(57) ABSTRACT

The present disclosure relates to a transmission system having a transmission subsystem, a transmission housing for housing the transmission subsystem, and a rotor operably associated with the transmission subsystem. The rotor has a weight and dimension to act as a flywheel. At least one stator pole segment is housed within the transmission housing and has at least one stator winding thereon positioned in proximity to a surface of the rotor. An inverter communicates with the stator winding and electrically energizes the winding to cause rotation of the rotor.

20 Claims, 3 Drawing Sheets

(51) Int. Cl.
*F02N 11/14* (2006.01)
*H02K 11/215* (2016.01)
*F02N 11/00* (2006.01)
*F02N 11/08* (2006.01)
*F02N 11/04* (2006.01)
*F16H 57/023* (2012.01)

(56) References Cited

U.S. PATENT DOCUMENTS

| | | | | |
|---|---|---|---|---|
| 4,958,095 | A * | 9/1990 | Uchida | F02N 11/04 |
| | | | | 123/41.31 |
| 5,015,903 | A | 5/1991 | Hancock et al. | |
| 6,441,506 | B2 * | 8/2002 | Nakashima | B60K 6/365 |
| | | | | 123/179.1 |
| 7,174,979 | B2 * | 2/2007 | Ohta | B60K 6/365 |
| | | | | 180/65.25 |
| 7,622,875 | B2 * | 11/2009 | Atarashi | B60L 15/025 |
| | | | | 318/400.41 |
| 8,545,367 | B2 * | 10/2013 | Hartz | B60K 6/40 |
| | | | | 477/5 |
| 8,641,573 | B2 * | 2/2014 | Ideshio | B60K 6/365 |
| | | | | 475/218 |
| 9,132,834 | B2 * | 9/2015 | Ideshio | B60K 6/383 |
| 9,431,884 | B2 * | 8/2016 | Ramamoorthy | H02K 51/00 |
| 9,887,656 | B2 * | 2/2018 | Hijikata | H02K 51/00 |

* cited by examiner

SEGMENTED SWITCHED RELUCTANCE MOTOR FOR POWERTRAIN ELECTRIFICATION

CROSS-REFERENCE TO RELATED APPLICATIONS

This application is a divisional and claims priority to U.S. patent application Ser. No. 15/285,217, filed on Oct. 4, 2016 (now allowed). The entire disclosure of the above application is incorporated herein by reference.

FIELD

The present disclosure relates to powertrain systems for motor vehicles, and more particularly to a segmented, switched reluctance motor for forming an electrified powertrain for a motor vehicle, and which is able to be integrated into a conventional transmission housing of a transmission of the vehicle.

BACKGROUND

This section provides background information related to the present disclosure which is not necessarily prior art.

A traditional front wheel drive (FWD) vehicle often has a transverse mounted powertrain, which typically includes an engine, transmission, flywheel, and torque converter. Those of ordinary skill in the art will readily appreciate that space is at a premium in this location and there is virtually no additional room for an electric motor to form a type of P2 hybrid that is known as a "P2 hybrid" in which the electric motor is disposed between the internal combustion engine and the transmission, the electric motor is not directly coupled to the internal combustion and the rotational speeds of the internal combustion engine and the electric motor are the same. This is illustrated in FIG. 1 which shows a typical engine/transmission architecture where the transmission housing is axially aligned with the crankshaft of the engine. An independent electric motor is typically secured to, or adjacent to, the transmission housing, for cranking the engine during a starting operation. These components are further arranged transversely in the engine compartment of the vehicle. More specifically, the available transverse space in a P2 hybrid configuration simply does not permit adding a conventional electric motor between the engine and the transmission. As a result, a hybrid powertrain must incorporate the electric motor at some other location on the vehicle, which can also be challenging from a space availability standpoint. Locating the electric motor remotely from the other powertrain components also can complicate the design and/or layout of the vehicle's exhaust system. Still further, the use of a fully independent electric motor at some other location, such as that associated with a P3 hybrid, and which is typically housed within its own housing, can add significant additional weight to the vehicle and/or alter the weight distribution of the vehicle.

Accordingly, there is a need for a P2 hybrid powertrain construction that integrates the electric motor between the internal combustion engine and the transmission without tangibly increasing the overall length of the powertrain.

SUMMARY

This section provides a general summary of the disclosure, and is not a comprehensive disclosure of its full scope or all of its features.

In one aspect the present disclosure relates to a transmission system comprising a transmission subsystem, a transmission housing for housing the transmission subsystem, and a rotor operably associated with the transmission subsystem. The rotor is supported for rotation within the transmission housing and has a weight and dimension to act as a flywheel. At least one stator pole segment is housed within the transmission housing, and has at least one stator winding thereon. The stator pole segment is secured to the transmission housing in a manner so that a portion thereof is in proximity to a surface of the rotor. An inverter is included which is in electrical communication with the stator winding of the stator pole segment. The inverter is configured to electrically energize the winding of the stator pole segment to cause rotation of the rotor.

In another aspect the present disclosure relates to a transmission system. The transmission system may have a transmission subsystem, a transmission housing having at least two openings, and a rotor operably coupled to the transmission subsystem. The rotor is supported for rotation within the transmission housing and has a weight and dimension to act as a flywheel. At least two independent stator pole segments are mounted within the plurality of openings. Each independent stator pole segment has a stator winding thereon, and the stator pole segments are spaced generally equidistantly circumferentially apart from one another, and secured to the transmission housing in a manner so that a portion of each stator pole segment is in proximity to a peripheral surface of the rotor. The independent stator pole segments collectively form a switched reluctance motor configured to power an engine coupled to the transmission subsystem.

In still another aspect the present disclosure relates to a method for forming a transmission. The method may comprise mounting a transmission subsystem within a transmission housing. The method may also involve coupling a rotor with the transmission subsystem and supporting the rotor for rotational movement within the transmission housing. The rotor may be configured to have a weight and dimensions to act as a flywheel. The method may also involve supporting a plurality of at least two independent stator pole segments, each having a stator winding thereon, and spaced generally equidistantly circumferentially apart from one another, at least partially within the transmission housing. The independent stator pole segments may also be supported in a manner so that a portion of each said independent stator pole segment is in proximity to a peripheral surface of the rotor. An inverter may be used which is in electrical communication with the stator windings of the independent stator pole segments, and configured to electrically energize the independent stator pole segments, to cause rotation of the rotor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
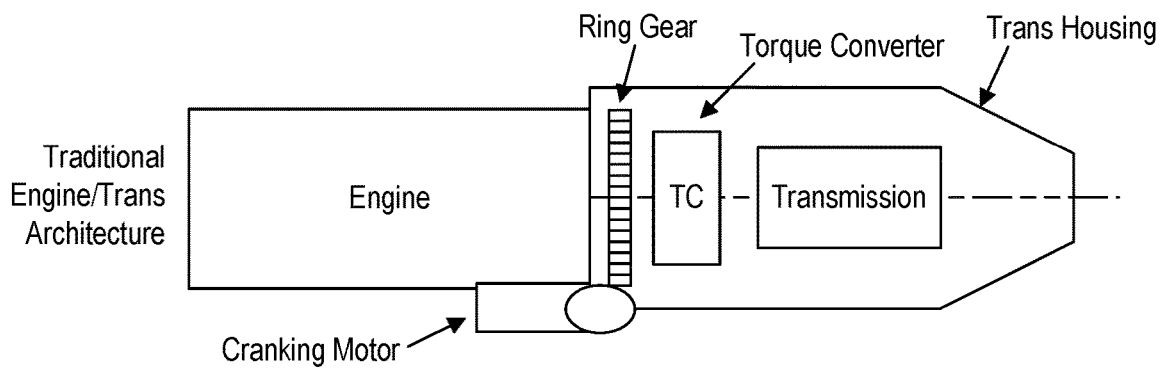
FIG. 1 is a high level block diagram illustration of a prior art powertrain layout in which the engine, ring gear, torque converter and transmission are arranged along a common axis.
Figure 2:
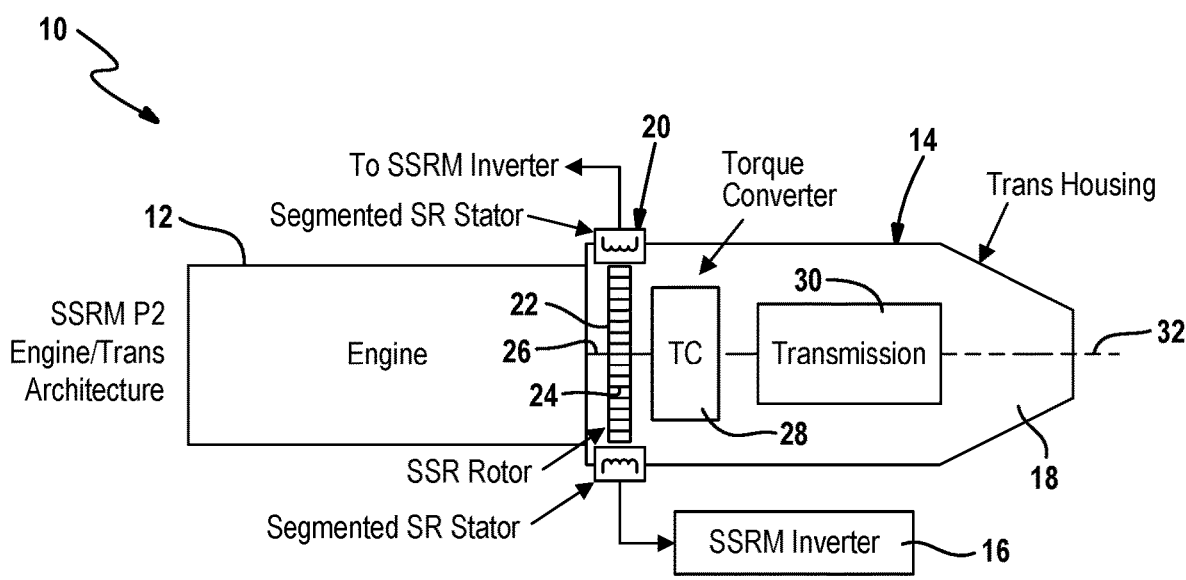
FIG. 2 is a high level block diagram of one embodiment of a hybrid powertrain system in accordance with the present disclosure, in which a switched reluctance motor is integrated into the transmission.
Figure 3:
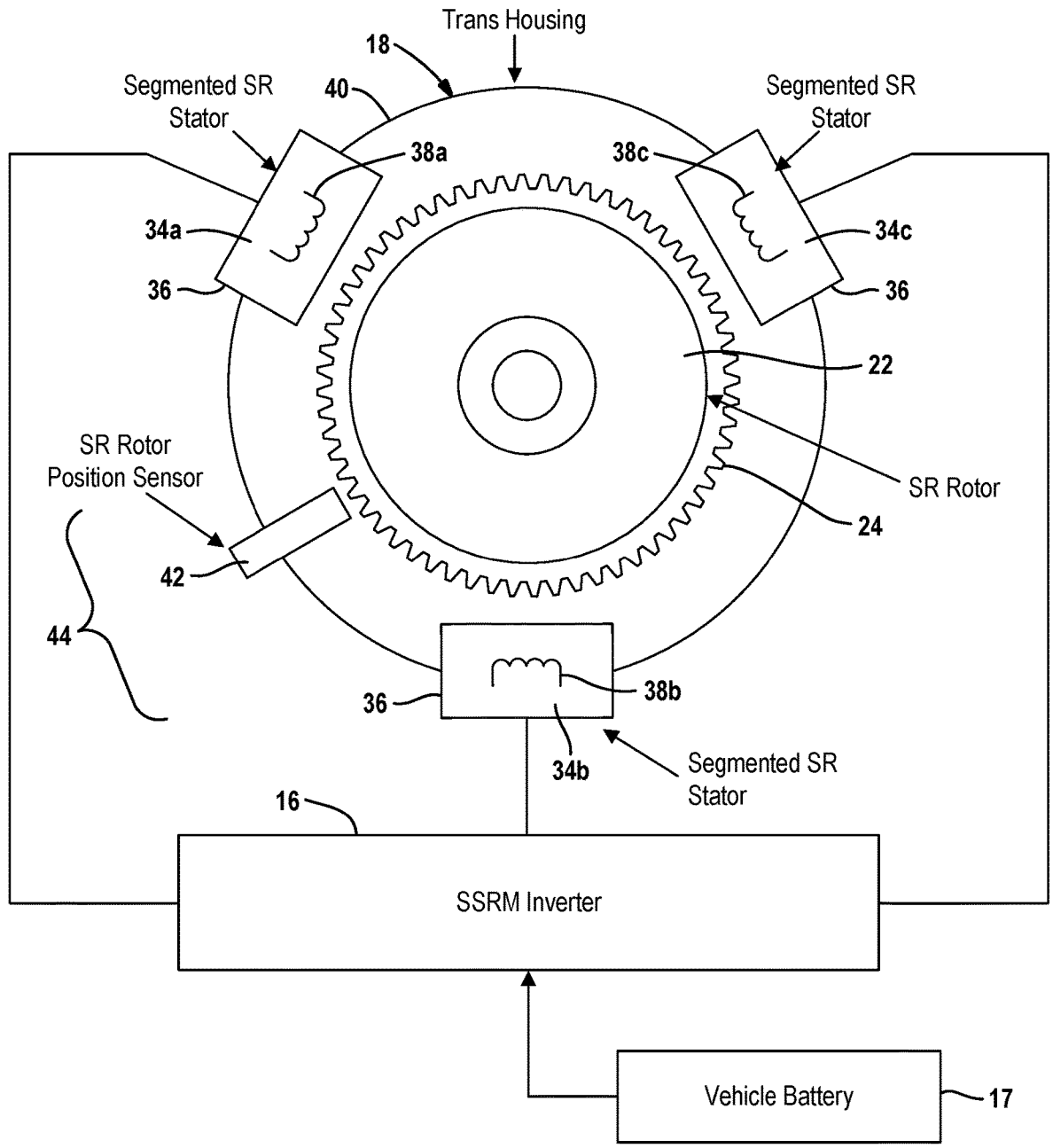
Figure 4:
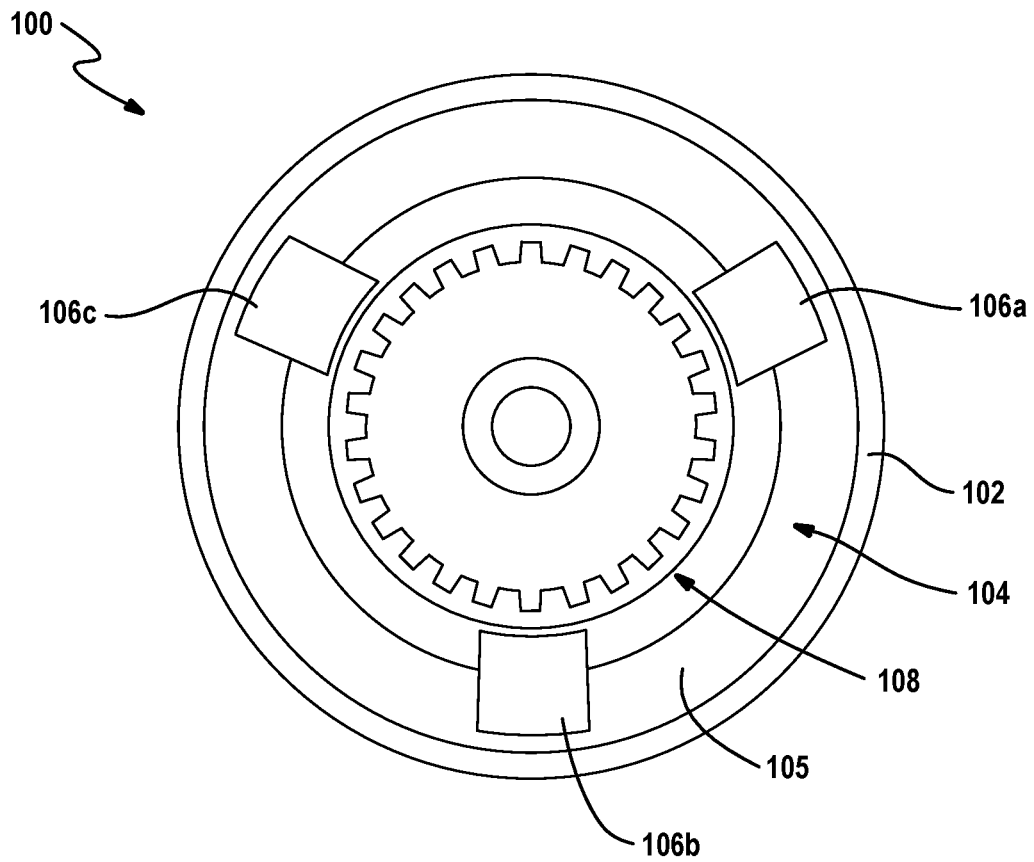

FIG. 3 is a block diagram end view of the transmission of FIG. 2, showing the switched reluctance motor integrated into the transmission, along with a block representation version of the inverter which is used to electronically control commutation of the switched reluctance motor; and FIG. 4 is a high level schematic diagram of another embodiment of the present disclosure in which a sleeve-like stator subsystem is contained entirely within a periphery of a transmission housing.

Corresponding reference numerals indicate corresponding parts throughout the several views of the drawings.

DETAILED DESCRIPTION

Example embodiments will now be described more fully with reference to the accompanying drawings.

Referring to FIG. 2, one embodiment of a hybrid powertrain 10 is shown in accordance with the present disclosure. The hybrid powertrain 10 (hereinafter simply "powertrain") 10 in this example includes an internal combustion engine 12, a transmission 14 and an electronic inverter 16. The inverter 16 receives DC power from a vehicle battery 17. The transmission 14 includes a housing 18 having an integrated, segmented stator system 20. Within the housing 18 is a rotor 22 having an optional gear 24 formed thereon or fixedly secured thereto. The rotor 22 has a diameter and a weight which is sufficient to enable the rotor 22 to act as a flywheel. The rotor 22 is fixedly secured to an input shaft 26 which is in turn operably coupled to the crankshaft (not shown) of the engine 12. Also operably coupled to the input shaft 26 is a torque converter 28 and a transmission subsystem 30. An output shaft 32 of the transmission subsystem 30 is used to drive at least a pair of wheels of the vehicle with which the powertrain 10 is being used.

A principal advantage of the system 10 is the integrated, segmented stator system 20 (hereinafter simply "stator system" 20). The stator system 20 is able to be integrated into transmission 14 without increasing the overall axial length of the powertrain 10, which is especially important when the powertrain is located in the P2 location of the vehicle, where space is very limited. With further reference to FIG. 3, the stator system 20 includes a plurality of independently formed stator pole segments 34a-34c which are mounted in suitable sized openings 36 in the transmission housing 18. In this example three stator pole segments 34a-34c are used to form a stator, although it will be appreciated that a greater number of stator pole segments could be used if desired. At least one pole segment will be required, but two or more pole segments are expected to be more preferable to eliminate any undesirable radial loading onto the main bearing(s) (not shown) supporting the rotor 22.

The stator pole segments 34a-34c are spaced equidistantly around the transmission housing 18 and each includes a coil winding assembly 38a-38c thereon. Thus, a plurality of coil windings make up coil winding assembly 38a, a separate plurality of coil windings make up coil winding assembly 38b and still another separate plurality of coil windings make up coil winding assembly 38c. The stator pole segments 34a-34c are shown projecting slightly outwardly from an outer surface 40 of the transmission housing 18, although depending on the size of the transmission housing, the stator pole segments could be contained entirely within the transmission housing 18. The stator pole segments 34a-34c are positioned such that a small axial air gap is present between radially inward surfaces of each stator pole segment and an outer surface of the gear 24 on the outer perimeter edge of the rotor 22. However, depending on the electromagnetic design requirements, the gap could comprise a radial gap, or possibly even a combination of axial and radial gaps.

As noted above, the equidistant spacing of the stator pole segments 34a-34c around the rotor 22 is preferred because it also eliminates the possibility of creating an unbalanced force vector on the bearing(s) (not shown) supporting the rotor 22 on the input shaft 26. A segmented rotor position sensor 42 is positioned closely adjacent the rotor 22 to detect an angular position of the rotor in real time and to supply an electrical angular position signal to the inverter 16, as is otherwise well known for commutating switched reluctance motors. The stator system 20 with its stator pole segments 34a-34c, the inverter subsystem 16 and the rotor position sensor 42 cooperatively form a switched reluctance motor 44.

It will also be understood that the rotor 22 forms a salient pole component, as is standard with any switched reluctance motor. To commutate the switched reluctance motor 44, selected pairs of the stator coils in each pole segment 34a-34c are energized at a time by the inverter 16 to pull the rotor 22 into alignment with the energized stator coil pole segments, as is well understood in the art. The inverter 16 operates in a closed loop fashion using the feedback signals from the rotor position sensor 42, which is detecting the presence of one or more elements (not shown) on the rotor 22, and detected currents in the coil winding assemblies 38a-38c, to determine which pair of the stator pole segments 34a-34c need to be energized to maintain rotational motion of the rotor 22. The complexity of the inverter 16 will increase as the number of stator coils and pole segments 34 increases.

A particular advantage of the system 10 is that the rotor 22 has a relatively large diameter and a weight that is similar or identical to that of a conventional flywheel typically used with automotive transmissions. This enables the motor 44 to provide higher torque values to the engine's crankshaft, which is advantageous when using the switched reluctance motor 44 to start the engine 12. The torque seen at the engine's 12 crankshaft will largely be a function of the rotor 22 diameter and the electromagnetic force created in the stator system 20.

In the embodiment shown in FIGS. 2 and 3, the stator pole segments 34a-34c overlay corresponding openings 36 in the transmission housing 18 so that the stator pole segments 34a-34c can project into the interior area of the housing in close proximity to the surface of the gear 24 of the rotor 22. Alternatively, the stator segments 34a-34c may be supported from independent frame-like members positioned closely adjacent the outer surface 40 of the transmission housing 18, which would allow the stator pole segments 34a-34c to project through openings in the transmission housing.

It will also be appreciated that packaging of the stator system 20 may be accomplished in a plurality of ways depending upon the specific application and the space available where the stator system is being used, as well as the torque output required. For example, FIG. 4 shows a transmission system 100 having a stator subsystem 104 which is contained entirely within a transmission housing 102. The stator subsystem 104 in this example includes a ring-like frame portion 105 which at least partially houses three stator pole segments 106a-106c spaced angularly equidistantly from one another. The stator pole segments 106a-106c may be identical in construction to the stator pole segments 34a-34c or they may differ slightly in the construction details if desired. The stator pole segments 106a-106c extend into close proximity with a rotor 108, although the precise spacing from the rotor 108 will depend on specific design requirements.

The powertrain 10 thus enables the switched reluctance motor 44 to be integrated into the P2 location between an engine and an otherwise conventional transmission, without increasing the overall axial length of the engine/transmission combination. This enables powertrain 10 to be used with transverse mounted engines where even a slight increase in axial length of the engine/transmission combination may not be possible because of space restrictions and interference from suspension and/or chassis components of the vehicle. As such, the powertrain 10 enables electrification of a vehicle powertrain in applications where the integration of a self-contained electric motor into the powertrain would not be feasible because of space constraints.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a, hybrid powertrain, the method comprising:
    mounting a transmission subsystem within a transmission housing;
    coupling a rotor with the transmission subsystem and supporting the rotor for rotational movement within the transmission housing;
    providing a plurality of discrete stator pole segments, each of the stator pole segments having at least one stator winding wound thereon;
    mounting each of the stator pole segments to the transmission housing such that each of the stator pole segments is at least partially within the transmission housing in a manner so that a portion of said stator pole segment is in proximity to a surface of the rotor, each of the stator segments being spaced circumferentially apart from one another; and
    using an inverter in electrical communication with the stator winding of the stator pole segment, and configured to electrically energize the stator pole segment, to cause rotation of the rotor.

2. The method of claim 1, further comprising using a rotor position sensor to detect an angular position of the rotor and to provide electrical rotor position signals to the inverter.

3. The method of claim 1, further comprising using a torque converter coupled to transmission subsystem.

4. The method of claim 1, further comprising supporting the stator pole segment fully within the transmission housing.

5. The method of claim 1, further comprising coupling the transmission subsystem through a torque converter to an engine, wherein the rotor has a weight and dimensions that permit the rotor to act as a flywheel for the engine.

6. A method for forming a transmission for use with an internal combustion engine, the method comprising:
    providing a transmission subsystem;
    housing the transmission subsystem in a transmission housing;
    supporting a rotor for rotation within the transmission housing, and operably coupling the rotor to the transmission subsystem and with a crankshaft of an internal combustion engine; and
    supporting a pair of stator pole segments fixedly relative to transmission housing, each one of said pair of stator pole segments having at least one winding thereon;
    further spacing the pair of stator pole segments from one another such that each is in proximity to the rotor, and such that the stator pole segments are positioned radially outwardly of a radially outermost portion of the rotor.

7. The method of claim 6, further comprising configuring the rotor with a weight sufficient to enable the rotor to act as a flywheel for the crankshaft of the internal combustion engine.

8. The method of claim 6, further supporting each one of the pair of stator pole segments at least partially within a corresponding pair of openings in the transmission housing.

9. The method of claim 6, further supporting each one of the pair of stator pole segments such that each is fully supported within the transmission housing and enclosed within the transmission housing.

10. The method of claim 6, further comprising using an inverter in electrical communication with the stator winding of each of the stator pole segments, to selectively, electrically energize the independent stator pole segments to cause rotation of the rotor.

11. The method of claim 10, further comprising using a rotor position sensor to detect an angular position of the rotor and to provide electrical rotor position signals to the inverter.

12. The method of claim 6, further comprising using a torque converter coupled to transmission subsystem.

13. The method of claim 6, further comprising providing a pair of openings in the transmission housing and mounting the pair of stator pole segments in the openings.

14. The method claim 6, further comprising providing an additional opening in the transmission housing and mounting an additional stator pole segment having an additional stator winding in the additional opening, such that the additional stator pole segment is in proximity to the rotor; and
    spacing the pair of stator pole segments and the additional stator pole segment equidistantly around a periphery of the rotor.

15. The method of claim 14, further comprising using an inverter in electrical communication with the stator winding of each of the pair of stator pole segments, and with the additional stator winding of the additional stator pole segment, to selectively electrically energize the pair of stator pole segments and the additional stator pole segment to cause rotation of the rotor.

16. The method of claim 15, further comprising using a rotor position sensor to detect an angular position of the rotor and to provide electrical rotor position signals to the inverter.

17. A method for forming a transmission for use with an internal combustion engine, the method comprising:
    providing a transmission subsystem;
    housing the transmission subsystem in a transmission housing;
    supporting a rotor for rotation within the transmission housing, and operably coupling the rotor to the transmission subsystem and with a crankshaft of an internal combustion engine, the rotor having a weight sufficient to enable the rotor to act as a flywheel for the crankshaft;

securing three stator pole segments, each having at least one winding thereon, to the transmission housing;

further spacing the three stator pole segments from one another by 120 degrees around a periphery of the rotor;

further spacing the three stator pole segments such that each is in proximity to the rotor, and such that the stator pole segments are positioned radially outwardly of a radially outermost portion of the rotor;

using a rotor position sensor fixedly supported relative to the housing to detect a position of the rotor; and using an inverter in electrical communication with the stator winding of each of the stator pole segments, to receive rotor position signals from the rotor position sensor and to selectively, electrically energize the independent stator pole segments to cause rotation of the rotor.

18. The method of claim 17, further comprising supporting the three stator pole segments such that each is positioned within a respective opening in the transmission housing, and such that each is pointing toward an axial center of the rotor.

19. The method of claim 17, further comprising supporting the three stator pole segments such that each is completely housed within the transmission housing, and such that each is pointing toward an axial center of the rotor.

20. The method of claim 17, further comprising coupling the transmission subsystem through a torque converter to the internal combustion engine to form a hybrid powertrain.

\* \* \* \* \*